Oct. 28, 1930. H. L. SCHOLL 1,780,044
TRUNK HOLDER
Filed Jan. 14, 1929
Fig.1.
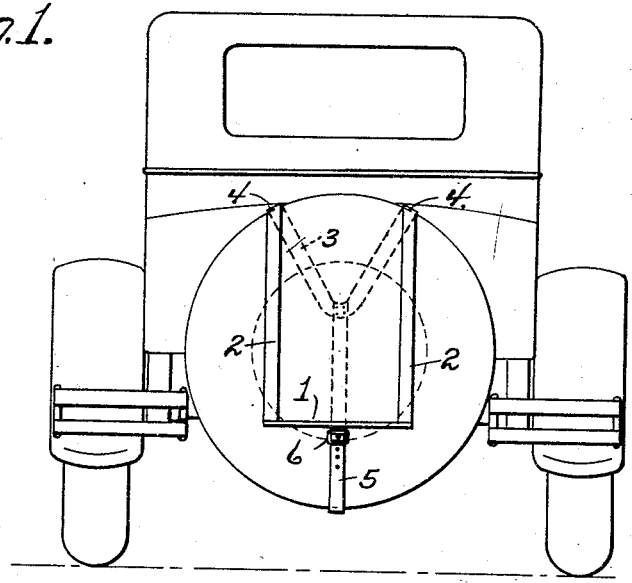
Fig.2.
Fig.3.
Fig.4.
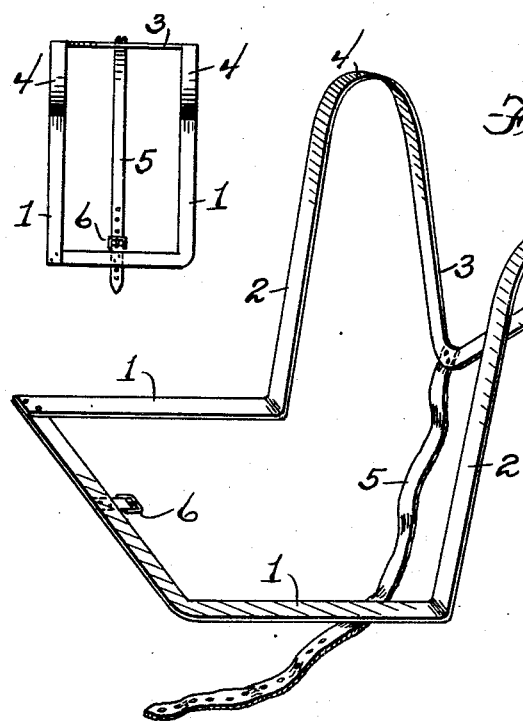
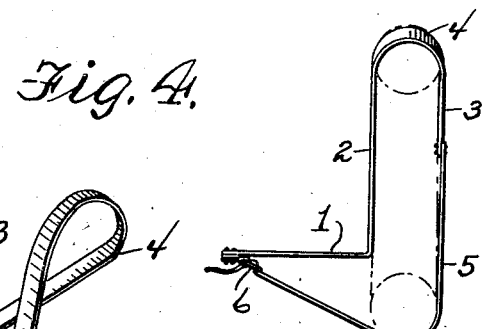
Henry L. Scholl
INVENTOR
BY Victor J. Evans
ATTORNEY Patented Oct. 28, 1930

1,780,044

UNITED STATES PATENT OFFICE

HENRY L. SCHOLL, OF YAKIMA, WASHINGTON

TRUNK HOLDER

Application filed January 14, 1929. Serial No. 332,372.

This invention relates to a holder device which is adapted to be attached to the spare tire of a motor vehicle and which is adapted to support a trunk or the like, the general object of the invention being to provide a frame formed of metal or the like and having an upper part which is adapted to be placed over the upper part of the spare tire and a horizontal part which acts as a support for the trunk or other object, with a strap for fastening the device to the tire.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:—

Figure 1 is a rear view of an automobile, showing the invention placed on the spare tire thereof.

Figure 2 is a plan view of the device.

Figure 3 is a side view thereof.

Figure 4 is a perspective view.

As shown in these views, the device is formed of a substantially yoke-shaped member with its limbs bent at rightangles and extending upwardly to form the horizontal part 1 which is of substantially U shape, and the pair of uprights 2, the lower ends of which are connected with the limbs of the horizontal part and a V-shaped part 3 has its upper ends connected with the upper ends of the uprights by the loop portions 4. Thus it will be seen that the parts 2, 3 and 4 can be placed over the spare tire, as shown in Figure 1, with the uprights in front of the tire, the part 3 in rear of the tire and the loop parts 4 passing over the upper portion of the tread part of the tire. Thus the device is supported on the tire, with the part 1 extending horizontally from the tire so that a trunk or the like can be placed on this horizontal part and suitably fastened by straps or the like to the device.

A strap 5 has one end connected with the apex of the part 3 and said strap is adapted to pass around the lower part of the tire and have its perforated other end engage with the buckle 6 which is connected with the central part of the cross piece of the U-shaped part 1, this strap acting to hold the device on the tire.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. A device of the class described comprising a U-shaped horizontal part, an upright connected with each limb of the U-shaped part, a V-shaped part and loop parts connecting the limbs of the V-shaped part with the upper ends of the uprights whereby the upper portion of the device can be placed over a spare tire of a motor vehicle and means for connecting the device to the tire.

2. A device of the class described comprising a U-shaped horizontal part, an upright connected with each limb of the U-shaped part, a V-shaped part and loop parts connecting the limbs of the V-shaped part with the upper ends of the uprights whereby the upper portion of the device can be placed over a spare tire of a motor vehicle, a strap connected with the apex of the V-shaped part and a buckle on the cross piece of the U-shaped part for receiving the other end of the strap.

In testimony whereof I affix my signature.

HENRY L. SCHOLL.